US011430030B1

(12) United States Patent
Tagra et al.

(10) Patent No.: US 11,430,030 B1
(45) Date of Patent: Aug. 30, 2022

(54) GENERATION OF RECOMMENDATIONS FOR VISUAL PRODUCT DETAILS

(71) Applicant: Adobe Inc., San Jose, CA (US)

(72) Inventors: Sanjeev Tagra, Redmond, WA (US); Sachin Soni, New Delhi (IN); Ryan Rozich, Austin, TX (US); Nitish Maurya, Noida (IN); Jonathan Roeder, Round Rock, TX (US); Ajay Jain, Ghaziabad (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/186,495

(22) Filed: Feb. 26, 2021

(51) Int. Cl.
| | |
|---|---|
| G06F 17/00 | (2019.01) |
| G06Q 30/06 | (2012.01) |
| G06F 3/0484 | (2022.01) |
| G06N 3/04 | (2006.01) |
| G06K 9/62 | (2022.01) |
| G06N 3/08 | (2006.01) |

(52) U.S. Cl.
CPC ....... *G06Q 30/0603* (2013.01); *G06F 3/0484* (2013.01); *G06K 9/6215* (2013.01); *G06K 9/6218* (2013.01); *G06K 9/6256* (2013.01); *G06N 3/0454* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 8,458,054 | B1* | 6/2013 | Thakur | G06Q 30/0643 |
| | | | | 705/27.1 |
| 2010/0217684 | A1* | 8/2010 | Melcher | G10L 15/22 |
| | | | | 705/26.1 |
| 2016/0210533 | A1* | 7/2016 | Kiapour | G06V 10/245 |
| 2021/0065269 | A1* | 3/2021 | Kumazawa | G06V 10/22 |

OTHER PUBLICATIONS

"Snappr Photography—Great Pro Photographers On-Demand", retrieved from the Internet: https://www.snappr.com [retrieved Feb. 10, 2021], 10 pages.

(Continued)

*Primary Examiner* — Mustafa A Amin
(74) *Attorney, Agent, or Firm* — Finch & Maloney PLLC

(57) ABSTRACT

Techniques are disclosed for generating image recommendations to facilitate the sale of a product. An example methodology includes identifying a product category associated with an image of the product provided by the seller, and a product sub-category associated with the product image. The method further includes retrieving one or more images of for-sale items. The retrieval is based on a search of for-sale listings using the identified product category and the identified product sub-category. The method further includes clustering the retrieved images of for-sale items into groups, each group associated with a perspective viewpoint of the for-sale item. The method further includes providing a selected image from each group as an image recommendation. The selection is based on a value score associated with each of the images of the for-sale items. A graphical status indicating completeness of the seller's image set is updated in response to recommended images being adopted.

20 Claims, 10 Drawing Sheets

(56) References Cited

OTHER PUBLICATIONS

"How to Build Your Own Efficient Ecommerce Photography Studio", retrieved from the Internet: https://www.bigcommerce.com/blog/how-to-build-your-own-efficient-ecommerce-photography-studio/#undefined [retrieved Feb. 10, 2021], 37 pages.

"7 Powerful Apps for Product Photography—Practical Ecommerce" retrieved from the Internet: https://www.practicalecommerce.com/7-Powerful-Apps-for-Product-Photography [retrieved Feb. 10, 2021], 6 pages.

"Product Camera is a Camera App That Creates Photos of Objects on White Backdrops", retrieved from the Internet https://petapixel.eom/2015/11/10/product-camera-is-a-camera-app-that-creates-photos-of-objects-on-white-backdrops/ [retrieved Feb. 10, 2021], 16 pages.

"New computer vision algorithm predicts orientation of objects", retrieved from the Internet: https://phys.org/news/2016-02-vision-algorithm.html [retrieved Feb. 10, 2021], 2 pages.

"Snap36—360 Degree eCommerce Product Photography & 3D Spin Services" retrieved from the Internet: https://snap36.com/ [retrieved Feb. 10, 2021], 17 pages.

"Automated Product Photography Solutions for still, 3D, 360 product photos", retrieved from the Internet: https://www.ortery.com/ [retrieved Feb. 10, 2021], 15 pages.

"Adobe brings new Amazon and Google integrations to Magento—TechCrunch", retrieved from the Internet: https://techcrunch.com/2019/05/13/adobe-brings-new-amazon-and-google-integrations-to-magento/?guccounter=1 [retrieved Feb. 10, 2021], 8 pages.

\* cited by examiner

User Interface Display Example 2
300

Window
310

Add more variety to your product image

We recommend adding more variety of Wallet images that will attract more customers to your product. Here are some images to refer to:

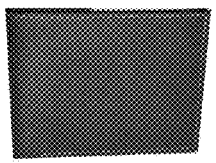 ✓ INCLUDED

Show front view of the wallet

320

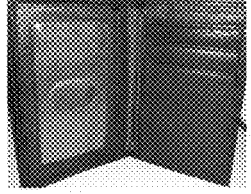 TIP 3

Show a wallet open from front with inserts visible

350

 TIP 1

Show a wallet open from the top

330

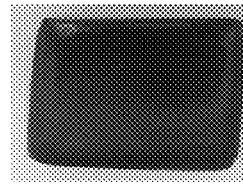 TIP 4

Show back view of a wallet closed

360

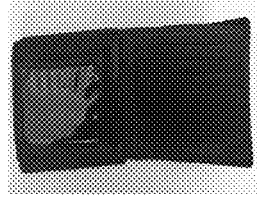 TIP 2

Show a wallet open from front

340

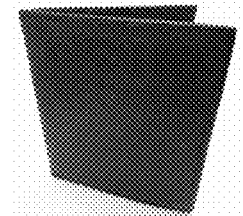 TIP 5

Show front view of a wallet slightly open

370

Cancel    Ok 

FIG. 3

User Interface Display Example 4
500

Window
510

Add more variety to your product image

We recommend adding more variety of Wallet images that will attract more customers to your product. Here are some images to refer to:

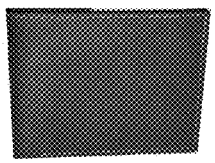
✓ INCLUDED

Show front view of the wallet

320

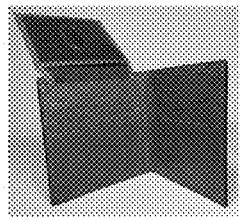
✓ INCLUDED

Show a wallet open from front with inserts visible

550

TIP 1

Show a wallet open from the top

330

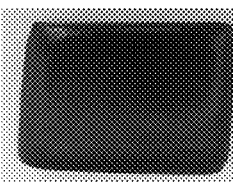
TIP 4

Show back view of a wallet closed

360

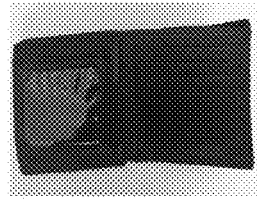
TIP 2

Show a wallet open from front

340

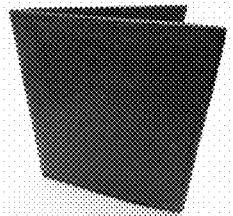
TIP 5

Show front view of a wallet slightly open

370

Cancel   Ok 

FIG. 5

GENERATION OF RECOMMENDATIONS FOR VISUAL PRODUCT DETAILS

FIELD OF THE DISCLOSURE

This disclosure relates generally to image processing, and more particularly, to image processing techniques for generating recommendations for visual product details.

BACKGROUND

Online shopping represents a significant and increasing portion of world economic activity. Product photographs are often considered an essential component of a successful e-commerce operation. This is partly because a strong visual presentation of a product attracts and sustains buyer attention, but also because online shoppers cannot touch, examine, or try the product that they are considering for purchase, and they must therefore rely on the various photos that depict the product. A sophisticated or otherwise successful online seller or e-commerce website may include a variety of high quality, professionally produced product photos that supply essential visual details of the products being offered for sale online. Small scale or otherwise less sophisticated sellers, however, may not have these resources and often simply take their own product pictures. In any such cases, due to a lack of knowledge and experience attendant such sellers, the resulting pictures may not cover all of the important aspects of the product. Even a more sophisticated seller may provide a set of pictures that does not cover all of the important aspects of a given product.

Various types of online selling platforms are available to facilitate online product sales, by offering support services such as website development and hosting, secure purchasing protocols, marketing analytics and targeting campaign development. However, such platforms lack the ability to provide useful guidance to the seller about relevant product details that would increase the probability of a successful sale, particularly with respect to visual product details. This inability stems from a technological shortcoming of current image processing systems. In particular, while a given image processing system may be able to detect and identify an object within an image, and even predict the pose of that object within the image, the system cannot see or otherwise infer an omission or information not depicted in the image. So, for instance, if a particular pose of an object is lacking from a given image, the system simply will not detect that pose; it will not, however, inform the user that an image having such a pose might be useful. These shortcomings preclude the determination and delivery of useful guidance to an online seller about relevant visual product details that might increase the probability of a successful sale, or otherwise be useful to the seller.

SUMMARY

Techniques are disclosed for generating product image recommendations for a user of an online product sale system. According to an example, an initial set of one or more product images depicting a target product is received from the user, and the system causes display of a graphic that indicates an initial completeness status of that initial product image set. In some such cases, the user can be prompted to learn more about how to improve that status by, for example, clicking on the graphic or other selectable feature of a user interface presented to the user. In response to such a user query, or more generally in response to the initial image set being uploaded, the system causes display of not only the initial product image set provided by the user but also a set of one of one or more recommended images, each recommended image depicting a comparable product in a particular pose or orientation not reflected in the initial image set. In some such example cases, each image of the initial image set can be graphically marked (e.g., checkmark or labelled as 'included') to show that those poses or orientations are accounted for in the completeness status. So, for example, if the user's initial product image set is a single image of the front view of a brown single-fold wallet to be offered for sale, the set of recommended images might include, for instance, not only the front view image of the brown single-fold wallet, but also the back view image of a some other wallet (e.g., black single-fold wallet) and a splayed open view image that shows the inserts of that other wallet or even some other wallet (e.g., red two-fold wallet).

In any such cases, with the recommended examples in hand, the user can confidently capture and upload one or more further images of the target product to be sold that mimics one or more poses or orientations depicted in the recommended image set. So, for instance, the user can then choose to adopt one of the recommended images by uploading or otherwise adding another product image to the initial image set that depicts the product being offered for sale in the pose or orientation depicted in the recommended image being adopted. The completeness status is updated each time the user adds an image to the product image set that covers a previously unaccounted for pose or orientation of the target product. The user can thus receive image recommendations in an intuitive manner and is given real-time actionable feedback as to the completeness of the product image set for the product being offered for sale. The user can adopt as many of the recommended images as desired. In some such example embodiments, adopting all of the recommended images will garner a completeness status of 100 percent, although such is not necessary.

Note that the recommended images themselves are not the images actually used by the user; rather, the recommended images provide the user visual examples of how the target product should be depicted with respect to perspective product views (e.g., pose or orientation). To this end, further note that the product depicted in the recommended images is not necessarily the same product as the one being offered for sale by the user; rather, the product or products depicted in those recommended images can be from a similar product category (e.g., same product category and sub-category) as the one being offered for sale but may have different attributes, such as a different color, different size, different number of folds, different number of inserts, different material, different brand, etc. Further note that the recommended images may be from multiple different listings provided in one or more digital marketplaces. Thus, for instance, assuming the product being offered for sale is a brown single-fold wallet, the recommended image set may include front and back view images of a single-fold black wallet and a splayed open view of a double-fold red wallet. The recommended images can nonetheless provide the user an intuitive visual guide as to how to depict a product in a set of images for purposes of selling that product online.

BRIEF DESCRIPTION OF THE DRAWINGS

FIG. 3 illustrates an example of a user interface display including a set of recommended product image types provided by the image recommendation system of FIG. 1, after the user has provided an initial product image, in accordance with an embodiment of the present disclosure.

FIG. 5 illustrates another example of a user interface display including the set of recommended product image types provided by the image recommendation system of FIG. 1, after the user has adopted another of the recommended product image types, in accordance with an embodiment of the present disclosure.

DETAILED DESCRIPTION

Figure 1:
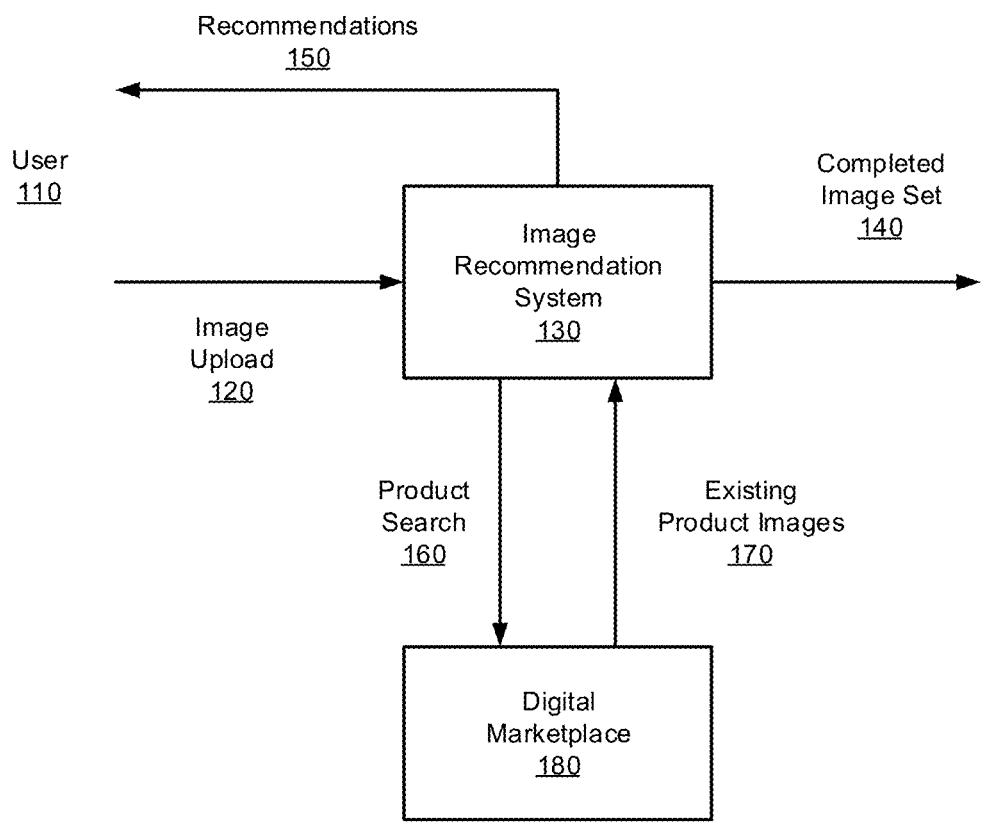
FIG. 1 illustrates user interaction with an image recommendation system configured to recommend a set of product image types to a user, with each image depicting a target product in a particular pose or orientation, and to graphically indicate a completeness status of the user's currently provided product image set relative to the recommended set, in accordance with an embodiment of the present disclosure.

Techniques are disclosed for generating product image recommendations for a user of an online product sale system, to provide relevant visual product details to facilitate the sale of the imaged product. As previously noted, product photography is an essential component of any successful e-commerce enterprise and key to generating sales. Online buyers largely make their purchasing decisions based on the images that sellers provide via the online product sale system. Oftentimes, online sellers are unaware of the importance of product images and the level of details that need to be conveyed in those images, or otherwise provide a set of product images that is not complete because that image set fails to meaningfully depict the various perspective viewpoints of the imaged product. As explained above, existing online product sale systems provide no feedback to a seller as to the completeness or robustness of a set of product images describing that seller's product, because such systems cannot infer missing information and have no mechanism by which to learn that missing information. The disclosed techniques solve this problem and can be used to recommend types of product images that will improve the visual product details of the seller's product listing, thereby providing the sort of detail and information for which buyers are most often looking.

At a high level, the techniques can be embodied in a system programmed or otherwise configured for generating image recommendations. In one example such embodiment, the system receives an initial product image set from a user, and causes display of an initial progress indicator that qualifies the number of relevant product viewpoints that the initial product image set depicts. The system includes one or more neural networks trained to identify a product category (e.g., category and sub-category) associated with the product depicted in the product image set. With the product category known, the system executes a tailored search, based on the identified product category, to retrieve one or more images of for-sale items that are comparable to the product depicted in the product image set. The retrieved images are then clustered into groups, wherein each group is associated with a perspective viewpoint (pose or orientation) of the for-sale item. The clustering can be done, for example, via one or more neural networks trained to detect a perspective viewpoint of an object in a given image or to otherwise cluster images based on a perspective viewpoints of objects detected in the images. The system selects an image from each group based on, for example, a score assigned by the neural network(s) that performs the clustering. The system then causes display of the selected images, so the user can see the poses of the for-sale item in the recommended images. The user can then take one or more new pictures of the product in any of those recommended poses, and uploads those new images to the system. The progress indicator is then updated to show the user how the uploaded product image set has improved, as a result of the additional product images showing the product in the recommended poses.

In more detail, and according to an embodiment, the techniques can be implemented in the context of an online selling platform (e.g., Amazon®, eBay®, or any seller having a website that allows for online selling of products, such as Apple®, Lowes®, Walmart®, etc.). In such a case, the user (seller) creates a product listing on the platform and adds to that listing an initial image set of one or more images of the product to be offered for sale (also referred to as a target product). In response to the upload of the initial image set, a graphical status indicator is presented to the user to readily convey to the user the level of completeness of that initial product image set. In response to a user's query to improve the current level of image set completeness, product image recommendations are presented to the user. The recommended product images are based on a search of a digital marketplace (e.g., Amazon®, eBay®, etc.) for similar products that are listed for sale (or were previously listed for sale) and the visual product images that accompany the listings for those products. In this manner, the search is tailored based on the target product being offered for sale by the user, as indicated in the initial image set uploaded or otherwise provided by the user. In some embodiments, for instance, machine learning is used to classify the product category and sub-category of the product depicted in the initial target product image set that is uploaded by the user. The product category and product sub-category that result from the neural network based classification process are then used to reduce the domain over which the search for similar products in the digital marketplace is conducted, thereby limiting or otherwise tailoring the search to products that are comparable to the user's target product, and thus products that are likely to be associated with appropriate product images including various perspective viewpoints. Note that the search domain may include, for example, the digital marketplace associated with an online selling platform being used by the user, or may include multiple digital marketplaces accessible via the Internet or some other communication network. Further note that archived (or closed) listings may be searched, so long as those listings remain accessible for search purposes. Thus, the for-sale items don't necessarily need to be actually on-sale at the time of the search (i.e., the sale may have concluded).

The images identified in the tailored search are then clustered into groups, with each group associated with a perspective viewpoint of the product depicted therein. Thus, each group shows a comparable product (e.g., similar category and sub-category as the target product) in a given pose or orientation (e.g., front view, back view, side view, top view, bottom view, internal view, unfolded view, etc.). An image from each of the various clusters (groups) that exceeds a confidence threshold is then selected for inclusion in the set of recommended images to be presented to the user. The resulting recommended images are then presented to the user as example product images that the user can use as a guide when photographing the user's target product to be sold.

For each image recommendation adopted by the user, the graphical status indicator is updated, so the user can see the benefit of having added a product image that covers a previously unaccounted for pose or orientation of the target product. The user can add one image at a time, or multiple images at a time. Note that the user need not adopt all of the recommended image types. Further note that the recommended images themselves are not the images actually used by the user; rather, the recommended images provide the user visual examples of how the target product should be depicted with respect to perspective view (e.g., pose or orientation). Further note that the recommended images may be from multiple different listings provided in one or more digital marketplaces, and thus may depict products that are similar or otherwise comparable to the target product (e.g., similar category and sub-category as the target product) but nonetheless different from the target product. For instance, the depicted products of the recommended images may be a different color and/or size than the target product, or include features that the target product doesn't have.

In one specific example such embodiment, an image recommendation system includes a first neural network (NN) trained to identify a product category associated with a product image provided (e.g., uploaded) by a user/seller, and a second NN trained to identify a product sub-category associated with the product image. The system further includes an image retrieval module configured to retrieve one or more additional product images of for-sale items from a digital marketplace. The retrieval is based on a search of for-sale product listings using the identified product category to establish a search domain and the identified product sub-category to refine the scope of that search. The system further includes a third NN trained to cluster the retrieved product images of for-sale items into groups. Each group is associated with one of N perspective viewpoints of the for-sale item which provides unique product details. As will be appreciated, a given product can have multiple viewpoints (e.g., front, back, top, bottom, inside, etc.), and thus the given product can have multiple groups of images. The system further includes an image selection module configured to present a selected image from each of the groups as an image recommendation. The selection is based on a calculation of a value score associated with each of the product images of the for-sale items (e.g., a measure of sale success and/or attention that the item received as captured in analytics). The system further includes a user interface configured to determine a percentage of the N perspective viewpoints that the user-provided product images show, and cause display of an initial progress indicator that depicts that percentage. The user interface is also configured to detect acceptance of one or more of the image recommendations by the user and to update the progress indicator in response to the detection. The progress indicator (e.g., a status bar or other graphical status indicator) provides an intuitive visual indicator, to the user, of the level of completion of the product image set that will be included in the listing and how many additional product images remain to be supplied/uploaded to provide a superior level of product detail. Numerous embodiments will be appreciated in light of this disclosure.

Definition of Terms

The term "product category" as used herein refers to a relatively coarse level description of a product. An example product category is a "woman's accessory" or an "electronic device."

The term "product sub-category" as used herein refers to a finer level description of the product. An example product sub-category that is associated with the "woman's accessory" category is a "purse" or a "handbag." An example product sub-category that is associated with the "electronic device" category is a "tablet" or "smartphone."

The term "visual product details" as used herein refers to a set of visual product details of a given product of a given product sub-category. The visual product details can be captured in a set of product images. An example set of product images that show visual product details associated with the product sub-category of a "purse" includes images of all sides of the purse, the internal design of the purse, the clasp of the purse, the brand/logo of the purse, the strap of the purse (if applicable), and the material and packaging of the purse. An example set of product images that is associated with the product sub-category of a "smartphone" includes images of all sides of the smartphone, the input/output ports of the smartphone, the home screen of the smartphone, the brand/logo of the smartphone, the case of the smartphone (if applicable), and the material and packaging of the smartphone.

The term "product" as used herein refers to any item that the user is attempting to sell. Examples of products include handbag, wallet, tablet, smartphone, car, dress, etc. The product can be anything that is capable of being sold online based on an image of the product. Further note the product can be new or used.

The term "for-sale item" as used herein refers to items that are currently (or recently or even previously) available for sale, by other sellers, through a given digital marketplace, such as Amazon® or eBay®. Such items may be grouped by category and sub-category. For example, if the user uploads an image of a wallet (e.g., the product) then for-sale items include wallets that are found to be for sale on the given digital marketplace. As noted, even previous for-sale items that remain accessible (via a corresponding listing that has been archived or otherwise remains accessible for search) can be used.

The term "for-sale listing" as used herein refers to the online listing of the for-sale item. The for-sale listing includes images of the for-sale item that illustrate the relevant details of the item. Archived for-sale listings or any for-sale listing that remains accessible to search (even closed listings where the sale has been completed) can be used.

The term "digital marketplace" as used herein refers to an online (e.g., website-based) market that facilitates buying and selling of products. Amazon® is one example of a digital marketplace. eBay® is another example of a digital marketplace.

The term "perspective viewpoint" as used herein refers to the viewing angle of an image of a product or item (the pose or orientation of an item, as captured in a given image). For example, the perspective viewpoint may be from the front of the product, the sides of the product, the back of the product, the top of the product, and the bottom of the product. Additionally, the perspective viewpoint may include a level of detail of the product or item. For example, the perspective viewpoint of a wallet can be "wallet open with inserts visible" and the perspective viewpoint of a purse can be "inside the purse" or "the purse clasp" or "stitching detail of the purse" for instance.

The term "value score" as used herein refers to the merit of a retrieved image from a listing of a for-sale item. The value score may be calculated from a number of factors including, for example, how many times the depicted item was successfully sold for listings that included the image, how many clicks were generated on the image, how many times the depicted item was added to the shopping cart for listings that included the image, how many times positive feedback was received for listings that included the image, how many times image-specific feedback was received where the user commented on a product feature only shown in that image. More generally, the value score may be calculated from any number of tracked analytics or metrics that can be used to characterize the value of a given image, whether directly (e.g., clicks on the image) or indirectly (e.g., successful sale for a listing that included the image).

General Overview

As noted previously, online selling platforms lack the ability to provide useful guidance to the seller about relevant product details that would increase the probability of a successful sale, particularly with respect to visual product details. To this end, techniques are provided herein for generating image recommendations for a user of the system (e.g., a seller of an item or product). The recommendations provide guidance as to which relevant visual product details should be included in the online listing to facilitate the sale of the item. The recommendations are illustrated in the form of images of other similar items that are retrieved from existing online listings. The search for these other images is based on a neural network based classification of the product that the user is attempting to sell, from the image (or images) that the user initially uploaded for the online listing.

In more detail, a methodology implementing the techniques according to one example embodiment includes identifying a product category associated with an image of the product provided by the seller. The method also includes identifying a product sub-category associated with the product image. The method further includes retrieving one or more images of for-sale items. The retrieval is based on a search of for-sale listings using the identified product category and the identified product sub-category to reduce the search domain. The method further includes clustering the retrieved images of for-sale items into groups. Each group is associated with a unique perspective viewpoint of the for-sale item. The method further includes providing a selected image from each of the groups as an image recommendation. The selection is based on a calculation of a value score associated with each of the images of the for-sale items. The method further includes displaying a progress indicator based on the percentage of recommendations that are adopted by the user. Many other variations and alternative embodiments will be appreciated in light of this disclosure.

FIG. 1 illustrates user interaction 100 with an image recommendation system 130, in accordance with an embodiment of the present disclosure. The image recommendation system 130 may be hosted on any suitable computing system such as a smart phone, tablet, mobile device, laptop, workstation, server, etc. In a server-client configuration, some functionality of the image recommendation system 130 may be carried out on a server computer and other functionality of the image recommendation system 130 may be carried out on a client device. For instance, a user interface of the image recommendation system 130 that allows for presentation of recommended product images and graphical status indicator to the user may execute on the user's device, and functionality with respect to the image processing and search can be carried out on the server side. In any case, the image recommendation system 130 is configured to accept an image upload 120, from a user 110, the image showing the product that the user wishes to sell. The system 130 analyzes the image to classify the product (e.g., product category and sub-category) and then searches 160 the digital marketplace 180 (e.g., Amazon®, eBay®, etc., or a combination of such marketplaces) for similar items listed for sale. The searched listings may include currently active listings, archived listings, and/or any products listings accessible to the system 130. In any case, select images of existing products for sale 170 are retrieved (or otherwise accessed) from digital marketplace 180 and provided as recommendations 150 to the user 110. The recommendations 150 are intended to show the user the types of images that would be helpful to more fully describe the item that the user is trying to sell. In particular, each recommendation image included in recommendations 150 shows the user 110 an example perspective view of a product similar to the product that the user 110 is attempting to sell, such as a front view of the product, or a back view of the product, or side views of a product, or a top view of a product, or a bottom view of a product, or an internal view of a product, or an unfolded or opened view of a product. In a more general sense, each perspective view of the recommendations 150 shows the depicted product in a pose or orientation that shows one or more features of the depicted product. The user can then take additional photos of the item/product to be sold in a similar pose or orientation and upload those new images until a completed or otherwise user-accepted image set 140 is assembled. In some cases, note the user 110 need not adopt all recommended images. For instance, in some such example cases, a recommended image included in recommendations 150 may not be relevant to the user's product (e.g., a single-fold wallet doesn't have a second fold, so an image depicting the second fold may be ignored).

Figure 2:
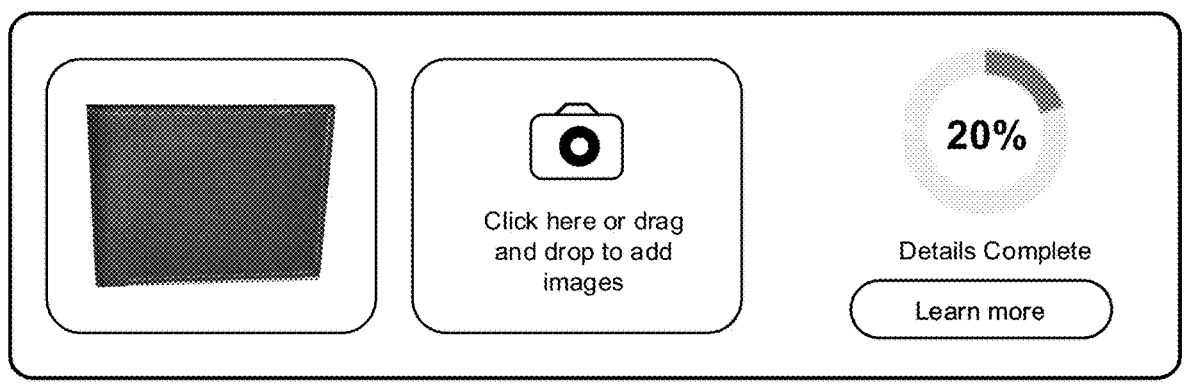
FIG. 2 illustrates an example of a user interface display including an initial uploaded product image provided by a user, along with an image set completeness status provided by the image recommendation system of FIG. 1, in accordance with an embodiment of the present disclosure.

FIG. 2 illustrates an example of a user interface display 200 including an initial user uploaded product image, along with a graphical status or progress indicator which indicates an image set completeness status provided by the image recommendation system 130, in accordance with an embodiment of the present disclosure. A window 210 is shown as one component of this UI display. The window 210 can be any section or portion of the user interface presented to the user (seller 230) and includes the initial image 220 of the product that was uploaded by seller 230. In this example, the target product is a wallet, and the initial image 220 shows a front view (e.g., a perspective viewpoint) of the wallet in a closed presentation. Also shown are instructions to seller 230, and window 210 further provides a mechanism for the seller to add another photo image (e.g., using drag and drop, or a browse-to-upload file feature), and an initial status indicator/progress bar 240. As can be seen in this example case, status indicator 240 shows a 20 percent completion achieved by the initial image 220, which is to say that four additional photos could be provided by the user to complete the product description, assuming that each added photo will contribute 20 percent toward a status of 100 percent complete, according to an embodiment.

Further note that window 210 provides a selectable link or feature ("Learn more" button) that seller 230 can click to learn more about the images that might help increase the status of the listing. For instance, in some embodiments, in response to seller 230 clicking that button, a new window 310 is presented to seller 230, as will now be discussed with reference to FIG. 3. Again, the window 310 can be any portion or screen of the user interface that is displayed 230 via a computing system to seller 230. In this regard, the use of the term window herein is not intended to limit the user interface to any particular structure, technology or webpage coding technique, as will be appreciated.

FIG. 3 illustrates another example of a user interface display 300 including guidance, tips, and recommended images, in accordance with an embodiment of the present disclosure. The window 310 is shown as a component of this UI display and includes sub-windows 320-370 which illustrate images depicting products with perspective viewpoints and feature details. In particular, sub-window 320 includes the initial user-provided image of the front view of the closed wallet that seller 230 is trying to sell. In this example case, this image is indicated by the check box and the label "INCLUDED" so as to show the user that the front view perspective is satisfied and is accounted for in the status indicator 240. On the other hand, sub-windows 330 through 370 show recommended images depicting additional perspective views missing from the initial image set and that may benefit the listing of seller 230. In more detail, sub-window 330 includes an image, retrieved from the digital marketplace 180, of a wallet viewed from the top and in an open presentation. The image is provided as an example for a first tip or recommendation. Sub-window 340 includes a second image tip, an image retrieved from the digital marketplace 180, of a wallet viewed from the front and in a fully open presentation. Sub-window 350 includes still another image of a wallet, retrieved from the digital marketplace 180, viewed from the front, in a fully open presentation with a feature detail of visible inserts, as a third tip. Sub-window 360 includes yet another image of a wallet, retrieved from the digital marketplace 180, viewed from the back in a closed presentation, as a fourth tip. Sub-window 370 includes a final image of another wallet, retrieved from the digital marketplace 180, viewed from the front in a slightly open presentation, as a fifth tip.

Note that the recommended images themselves are not the images to be used by seller 230; rather, the recommended images provide seller 230 visual examples of how the target product should be depicted with respect to perspective view (e.g., pose or orientation). Further note that the product depicted in the recommended images is not necessarily the same product as the one being offered for sale by the user (although it could be if that is what the listing search returned); rather, the product or products depicted in the recommended images of this example are from a product category (e.g., men's accessory) and a product sub-category (e.g., wallet) similar to the product being offered for sale but may have different attributes, such as a different color, different size, different number of folds, different number of inserts, different material, different brand, etc. Further note that the recommended images may be from multiple different listings provided in one or more digital marketplaces. So, for example, in this example case, sub-window 330 shows a first wallet that is light brown, sub-windows 340 and 360 show a second wallet that is black, and sub-windows 350 and 370 show a third wallet that is dark brown. These images of wallets are from multiple listings on marketplace 180.

Note that the messaging to seller 230 can be tailored based on the product category and product sub-category (in this case, wallet). Such messaging is helpful in prompting the user. Further note that a copy of the images presented in sub-windows 320-370 need not be made. Rather, in some embodiments, each of sub-windows 320-370 displays the image of the original listing, via a link, for instance. Further note that rights associated with images posted to listings in an online selling platform or a given digital marketplace 180 can vary from one system to another, and any restrictions stemming from such rights can be used to exclude images from use as recommendations.

Figure 4:
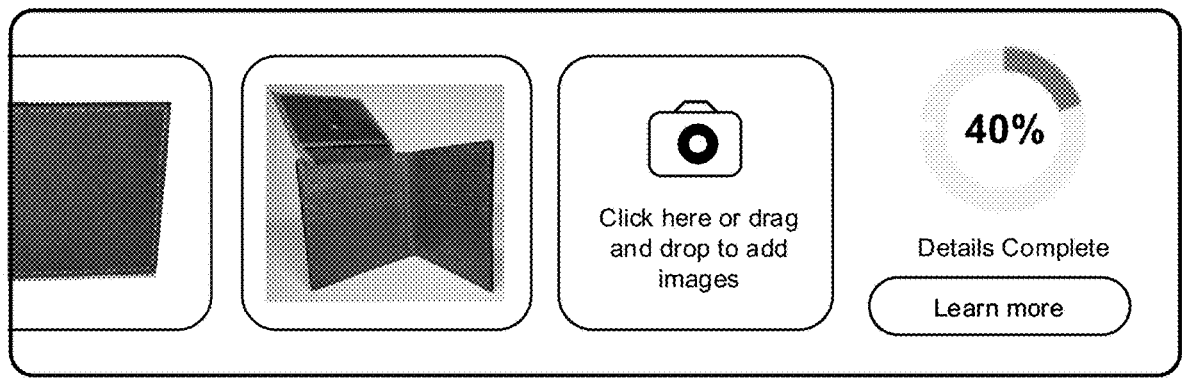
FIG. 4 illustrates another example of a user interface display including an updated set of user uploaded product images, along with an updated image set completeness status provided by the image recommendation system of FIG. 1, in accordance with an embodiment of the present disclosure.

FIG. 4 illustrates another example of a user interface display 400 including a set of user uploaded product images, along with an updated image set completeness status provided by the image recommendation system 130, in accordance with an embodiment of the present disclosure. Like window 210, window 410 is shown as a component or portion of this UI display. The window 410 includes the initial image 220 of the wallet that was initially uploaded by seller 230, providing a front view of the wallet in a closed presentation. An additional image 420 is now uploaded by seller 230, in response to prompting provided with respect to user interface 300 of FIG. 3. As can be seen, uploaded image 420 depicts the wallet to be sold in a splayed open fashion, as recommended by tip 3 of user interface 300. As can be further seen, the status indicator 240 has been updated in response to image 420 being uploaded, and now indicates a level of completeness of 40 percent. Also shown are instructions to seller 230, allowing for the addition of more additional photos, to further increase the level of completeness. So, in this example case, the user can again click on the "Learn more" button to continue the process of updating the product image set, which takes seller 240 to the user interface shown in FIG. 5, to repeat the process discussed with respect to FIG. 3.

In more detail, FIG. 5 illustrates another example of a user interface display 500 including guidance, tips, and recommended images, in accordance with an embodiment of the present disclosure. The window 510 is shown as a component of this UI display and is similar to window 310 of FIG. 3, except that it shows the adoption by seller 230 of tip 3 in sub-window 550. Sub-window 550 includes an image of the wallet, that the user is trying to sell, viewed from the front, in a fully open presentation with a feature detail of visible inserts, as recommended by tip 3. Seller 230 can now choose to adopt one or more of the tips provided in sub-windows 330, 340, 360, and/or 370, just as previously done by seller 230 with respect to tip 3 of sub-window 350.

It will be appreciated that the wallet, and the views described above, are provided as just one example of a type of product that could be sold online. As another example, the product could be a smartphone, and recommended views may include front, back, side views, as well as an example home screen image or application UI image. Other views could include zoomed in images that show the various buttons and other hardware features on each side of the device. Still other views might include the packaging, for example, if the product is supplied in an attractive box.

Framework and System Architecture

Figure 6:
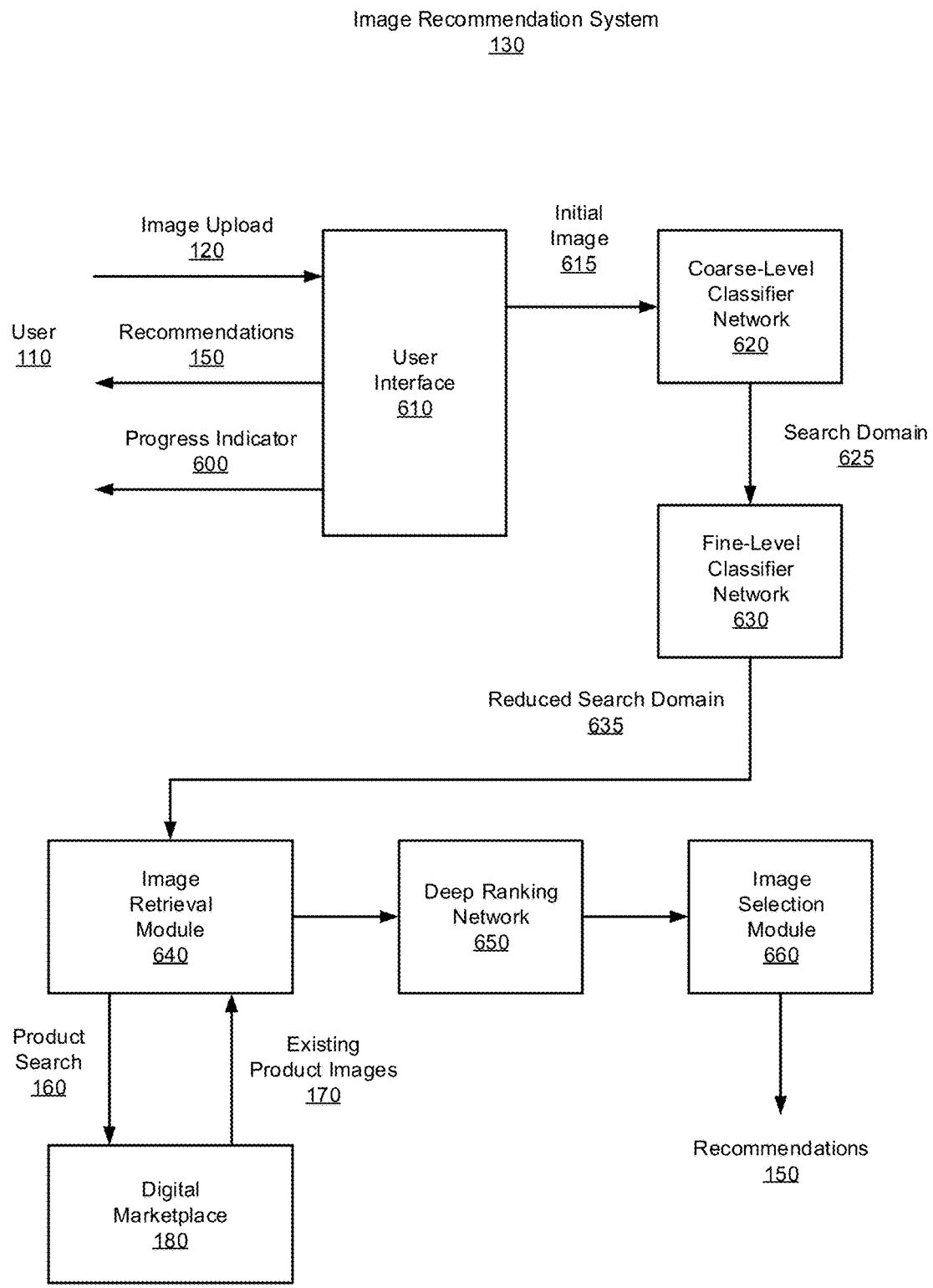
FIG. 6 is a block diagram of the image recommendation system of FIG. 1, configured in accordance with an embodiment of the present disclosure.

FIG. 6 is a block diagram of the image recommendation system 130, configured in accordance with an embodiment of the present disclosure. The image recommendation system 130 is shown to include a user interface 610, a first neural network (e.g., a coarse-level classifier network) 620, a second neural network (e.g., a fine-level classifier network) 630, an image retrieval module 640, a third neural network 650 (e.g., a deep ranking network), and an image selection module 660. As previously explained above, system 130 can execute on a seller's computing device, or in a client-server arrangement such as the example case where user interface 610 executes on the seller's computing system and each of 620 through 660 run on a server or cloud-based machine accessible to the seller's computing system. In the latter case, the seller's computing system can access the server or cloud-based machine via a communication network such as a combination of a local area network and wide area network (e.g., the Internet or a company's private wide area network).

The user interface 610 is programmed or otherwise configured to allow the user/seller 110 to interact with the image recommendation system 130. Images 120 of a product are provided (e.g., uploaded to the system 130) by a user 110 as part of a process for selling the product through an online or digital marketplace 180. The images 120 provide feature details of the product to shoppers and potential buyers. The interactions with the UI include, but are not limited to, uploading of images 120 from the user, providing recommendations 150 back to the user, and providing a progress indicator 600 to the user. The progress indicator 600 is updated as the user accepts or otherwise adopts the image recommendations by uploading additional relevant images that depict the product to be sold in a recommended perspective view. Example aspects of user interface 610 include those shown, for instance, in FIGS. 2 through 5, and that previous discussion is equally applicable here. Numerous variations will be appreciated in light of this disclosure.

The first neural network is a coarse-level classifier network 620 that is trained to identify a product category associated with the product that is included in the first of the user uploaded images 615 (although, in some embodiments, the process may also be performed on subsequent image uploads). An example of a product category is "electronic device." In some embodiments, the first NN is a region-based convolutional neural network trained to detect the product and generate a product category label. In some embodiments, the first NN is a ResNet-101 network, although other suitable networks may be used in light of the present disclosure. The training is a supervised training method which uses training images collected from a suitable dataset that includes images of product categories of interest. In some embodiments, the first NN generates a bounding box around the product, a confidence score, and a label. If the confidence score exceeds a threshold value, the label is used as part of the search for suitable reference imagery, as described below. The identification of a product category creates an initial search domain 625.

The second neural network is a fine-level classifier network 630 that is trained to identify a product sub-category associated with the product image. The product sub-category is a finer level classification of the product. For example, given a product category of "electronic device," one sub-category could be "tablet" and another sub-category could be "smartphone." The use of two levels of classification (coarse and fine) provides improved accuracy in identifying products. In some embodiments, the second NN is a convolutional neural network trained to generate a sub-category product label and a confidence score. The training is a supervised training method which uses training images collected from a suitable dataset that includes images of product sub-categories of interest. In some embodiments, additional training images are generated by rotating the training images through a range of orientation angles. The identification of a product sub-category creates a reduced search domain 635.

The image retrieval module 640 is programmed or otherwise configured to search for and retrieve one or more images of for-sale items 170 from the digital marketplace 180. The retrieval is based on a product search 160 of for-sale listings on the digital marketplace 180 using the identified product category (e.g., the initial search domain 625) and the identified product sub-category (e.g., the reduced search domain 635). For example, if the user is attempting to sell a smartphone, the product category and sub-category lead to a reduced search domain of "smartphone" and the marketplace is searched for images of smartphones for sale that provide a broad variety of visual product details, for example from different perspective viewpoints, as previously described.

The third neural network is a deep ranking network 650 that is trained to cluster the retrieved images of for-sale items into groups. Each group contains images that are associated with a unique perspective viewpoint of the for-sale item that provide unique feature details, for example, front view, back view, side view, view showing internal details, etc. In some embodiments, the third NN is a convolutional neural network that includes a ranking layer. The network is trained to recognize visual similarity of the for-sale items and to recognize a similarity of perspective viewpoint of the images of the for-sale items so that these similar images can be clustered into groups. The deep ranking network acts as a function that maps a given image to a point in Euclidean space, for which the training process teaches the function to assign smaller distances in the Euclidean space to more similar images and greater distances between images that are less similar.

The training is a supervised training method using training images from commercially available image databases, or other suitable sources. Photos of animals, people, and other non-product type images are pruned from the dataset prior to use for training. In some embodiments, the training images are grayscale (or color images converted to grayscale) so that color is not a factor in the clustering process. In some embodiments, the training process uses triplet training images, each triplet comprising a query training image, a positive training image, and a negative training image. The positive image is a training image that the classifier should match to the query image, while the negative image is a training image that the classifier should not match to the query image. During training with triplet images, the training loss value is calculated with an objective to constrain the query training image to match the positive training image while simultaneously contrasting with the negative training image. One example of a triplet loss equation is:

$$\mathcal{L}_{triplet} = \log(1 + e^{\|f_{query} - f_{tgt}^+\|_2 - \|f_{com} - f_{tgt}^-\|_2})$$

where $f_{query}$ represents network generated features for the query training image, $f_{tgt}^+$ represents network generated features for the positive training image, $f_{tgt}^-$ represents network generated features for the negative training image, and $\|\cdot\|_2$ denotes the L2 norm or Euclidean distance.

The image selection module 660 is programmed or otherwise configured to provide a selected image from each of the groups as an image recommendation to enhance the sales offer. In some embodiments, the selection is based on a calculation of a value score associated with each of the images of the for-sale items. The value score is based on a number of factors or metrics including an indication of whether or not the for-sale item was eventually sold on the digital marketplace, and how many views (or clicks) were garnered by the for-sale item. In some embodiments, these metrics (e.g., successful sale and level of interest) are obtained from the digital marketplace 180. Any other suitable metric that can be obtained from the marketplace or other source may also be used. In some embodiments, the value scores are normalized over all of the clusters to allow for a meaningful comparison between clusters. If the highest normalized value score of a particular cluster is less than a selected threshold then that cluster will not contribute an image to the recommendation.

Figure 7:
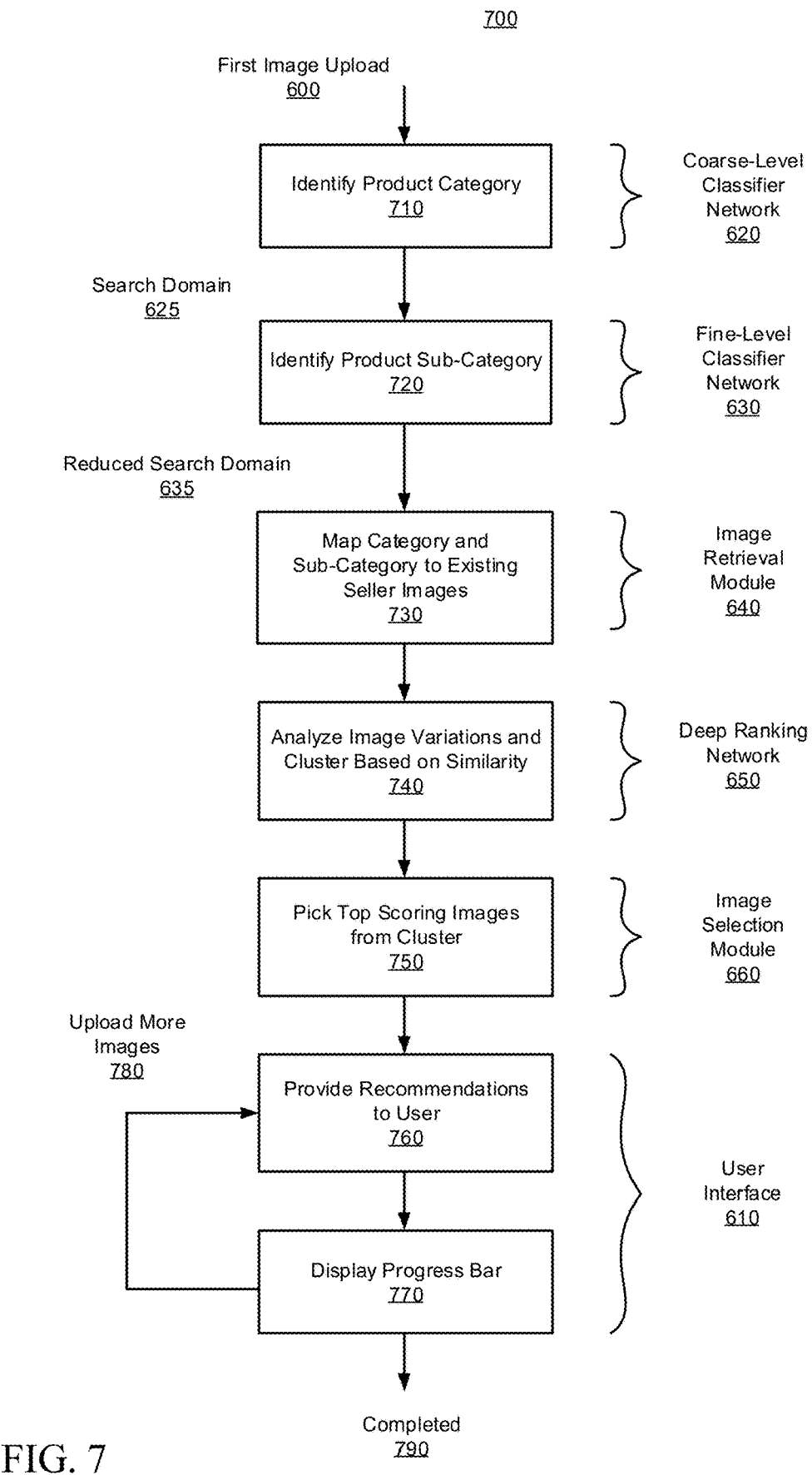
FIG. 7 is a block diagram illustrating operation of the image recommendation system of FIG. 1, in accordance with an embodiment of the present disclosure.

FIG. 7 is a block diagram illustrating operation of the image recommendation system 130, in accordance with an embodiment of the present disclosure. At operation 710, the coarse-level classifier network 620 identifies a product category associated with the first image upload 600. The product category provides an initial search domain 625 for searching of the digital marketplace 180. At operation 720, the fine-level classifier network 630 identifies a product sub-category associated with the first image upload 600. The product sub-category provides a reduced search domain 635 for searching of the digital marketplace 180.

At operation 730, the image retrieval module 640 maps the identified category and sub-category to existing seller images in the digital marketplace 180 and retrieves those mapped images. At operation 740, the deep ranking network 650 analyzes image variations among the retrieved images and clusters the retrieved images into groups based on similarity. At operation 750, the image selection module 660 picks the top scoring images from each cluster or group to be recommended images.

At operation 760, the recommended images are provided to the user through the user interface 610 and, at operation 770, the progress bar is updated and displayed. Additional images, based on the recommendations, may be uploaded 780 by the user until all recommendations have been adopted or the user decides that the process is complete and satisfactory 790. The progress bar continues to be updated as the user uploads additional images that visually match the provided recommendations. In some embodiments, the determination of whether or not the user uploaded images visually match the provided recommendations can be performed by the deep ranking network 650. The following pseudocode illustrates one example for updating the progress bar (e.g., the progress variable below, the value of which ranges from zero to one, representing zero to 100 percent):

```
//      R is the set of N images available for recommendation
//      Recommendations is the set of images being recommended
//      U is the set of uploaded user images
progress ← 0
number recommendations adopted ← 0
recommendations ← Nil
For each image R(i)
{
        R(i) match found ← False
        For each image U(j)
        {
                If R(i) and U(j) are visually similar
                {
                        Increment number recommendations adopted
                        R(i) match found ← True
                        Break
                }
        }
```

```
        If R(i) match found is False
                Add R(i) to recommendations
}
Progress ← number recommendations adopted / N
Display progress and updated recommendations
```

Figure 8:
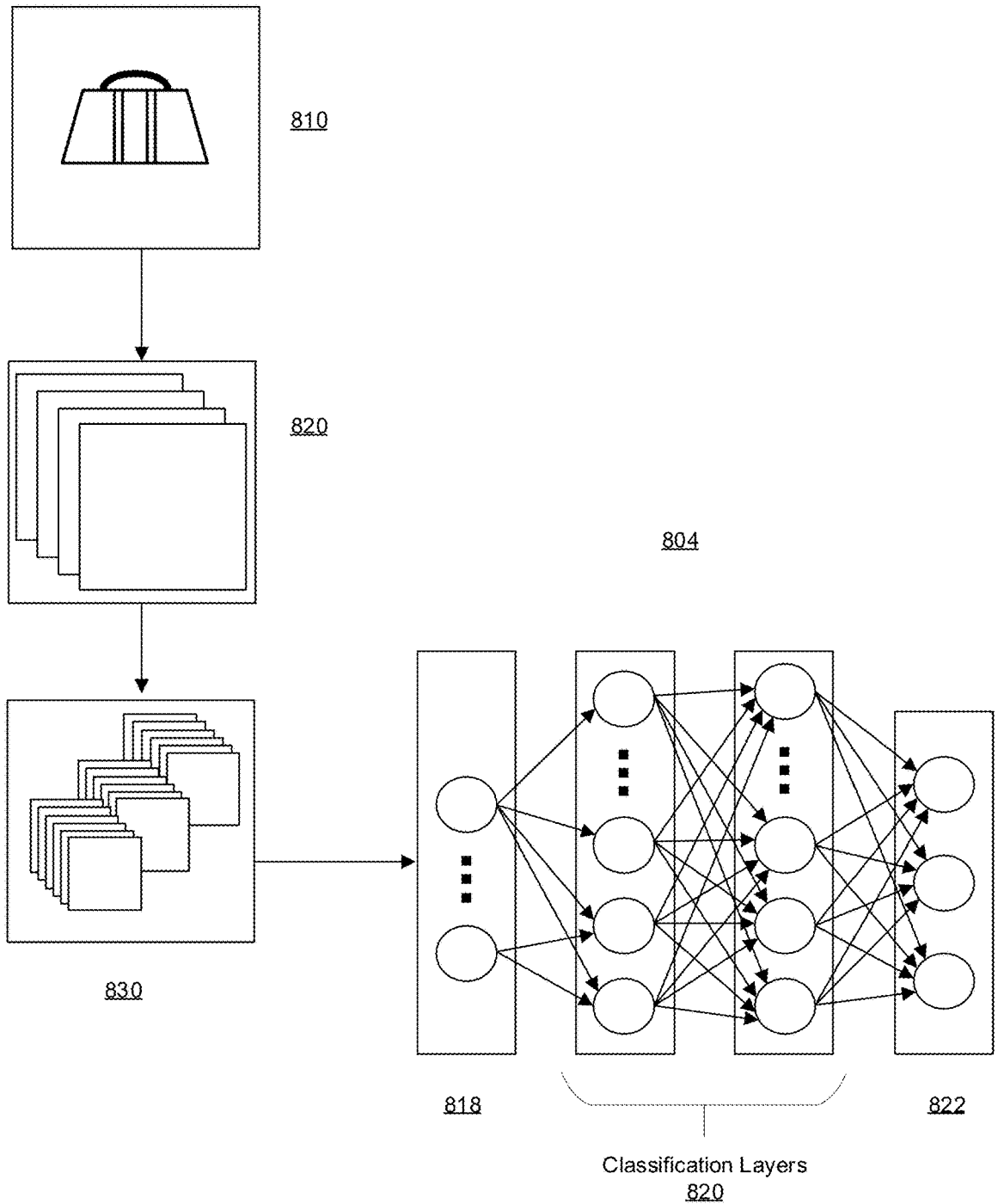
FIG. 8 illustrates an example product classification system that is a component of the image recommendation system of FIG. 6, in accordance with some embodiments of the present disclosure.

FIG. 8 illustrates the network structure 800 of an example product classification system that is a component of the image recommendation system 130 of FIGS. 1 and 6, in accordance with some embodiments of the present disclosure. Specifically, classifier networks 620 and 630 and deep ranking network 650 employ a neural network structure 800 to classify images. As an illustration, image 810 (e.g., a handbag product) is provided to the network 800. One or more filters are applied to the image 810 by one or more convolutional layers 820, according to some embodiments. More specifically, one or more convolutional layers 820 break down the image 810 into various filtered feature maps that identify locations and relative strengths of detected features in the image. The same filter can be systematically applied across different sections of image 810, which allows for the detection of salient image features regardless of their location in the image 810. In this application, the salient image features are those associated with the category and sub-category of products in the image.

According to some embodiments, pooling layers 830 are used to further down sample the detected features from the feature maps generated by the convolutional layers 820. In essence, pooling layers 830 operate on the individual feature maps to generate smaller pooled feature maps. The pooled feature maps summarize the feature data from the feature maps. According to some embodiments, the resulting pooled feature maps are more robust to any changes in position of the salient features from the image 810.

Once the feature maps or pooled feature maps have been generated from image 810, the feature map data is fed as input to neural network 804. Neural network 804 includes an input layer 818, one or more product classification layers 820, and an output layer 822. Each of the layers of neural network 804 include neurons that represent mathematical functions and/or weights applied to data received as input to the neuron. The output of a neuron of one layer is received by each of the neurons in the proceeding layer. Accordingly, input layer 818 of neural network 804 can include any number of neurons that receive the image feature data from the pooled feature maps.

According to some embodiments, product classification layers 820 are configured during training of neural network 804 to identify product classifications based on the product features encapsulated in the pooled feature maps. The number of product classification layers 820, the number of neurons in each of the layers, and the function performed by each neuron are established during supervised training as neural network 804 learns how to distinguish between different products. Accordingly, the characteristics (e.g., number of layers, number of neurons in a given layer, etc.) of product classification layers 820 can be different depending on various training factors. According to some embodiments, output layer 822 includes a number of neurons that correspond to the possible product classifications for each identified product in image 810.

Methodology

Figure 9:
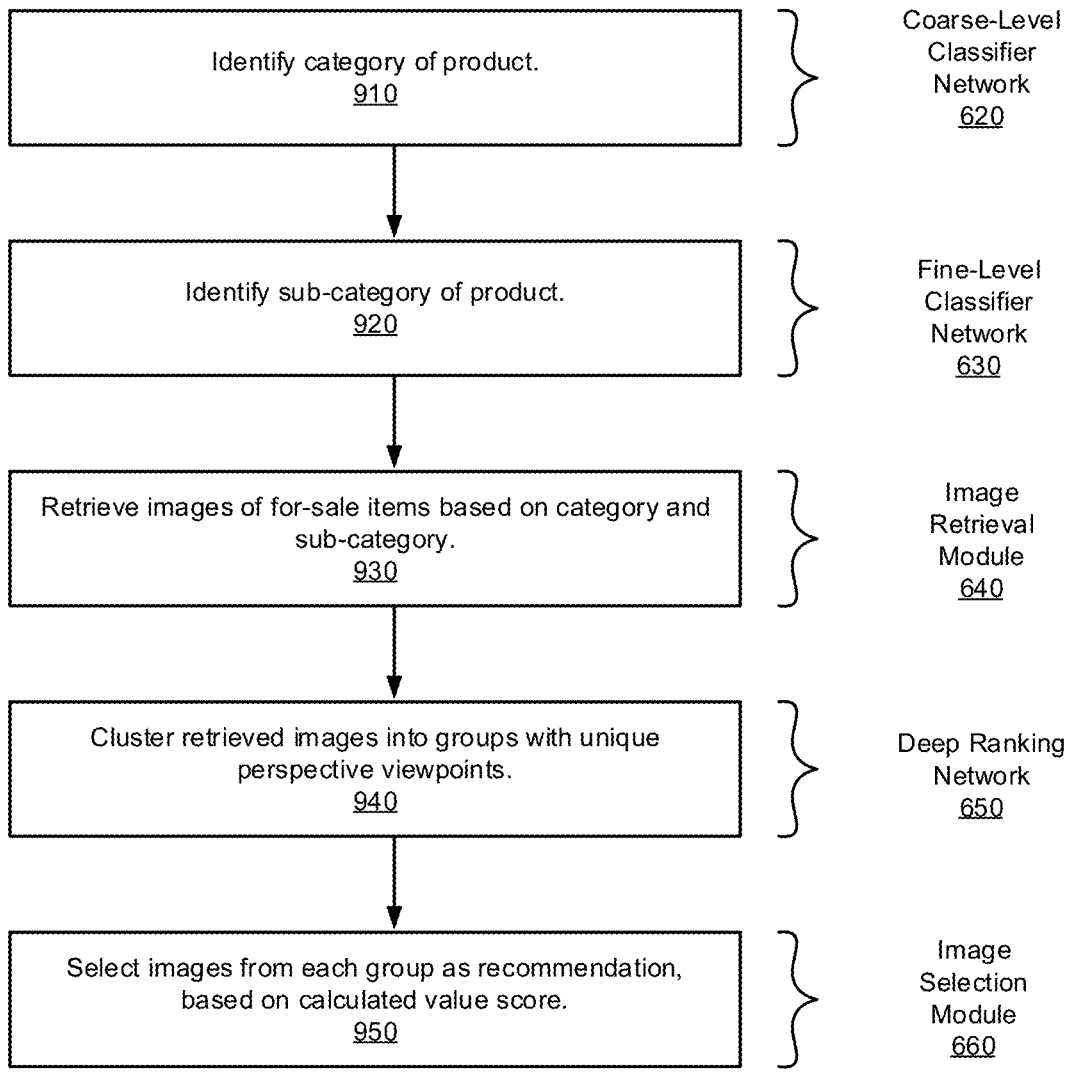
FIG. 9 is a flowchart illustrating a method for generating image recommendations for an online product seller, in accordance with an embodiment of the present disclosure.

FIG. 9 is a flowchart 900 illustrating a method for generating image recommendations for an online product seller, in accordance with an embodiment of the present disclosure. As can be seen, the method is described with reference to the configuration of image recommendation system 130, and components thereof, of FIG. 6. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration; rather, the image recommendation techniques provided herein can be used with a number of architectures and platforms and variations, as will be appreciated.

The method commences, at operation 910, by identifying a product category associated with a product that is included in an image. The image of the product is provided (e.g., uploaded to the system) by a user of the system as part of a process for selling the product through an online marketplace in which details and images of the product are provided to shoppers and potential buyers. The product category is a coarse level classification of the product, as previously described. In some embodiments, a first neural network, that is trained to perform the coarse level classification, is employed to identify the product category.

The method continues, at operation 920, by identifying a product sub-category associated with the product that is included in an image. The product sub-category is a finer level classification of the product, as previously described. In some embodiments, a second neural network, that is trained to perform the fine level classification, is employed to identify the product sub-category.

At operation 930, one or more images of for-sale items are retrieved, for example from one or more online marketplaces. The retrieval is based on a search of for-sale listings in the online marketplace, using the identified product category and the identified product sub-category. For example, if the user is attempting to sell a men's wallet, the product category and sub-category lead to "men's wallet" and the marketplace is searched for images of men's wallets that provide a broad variety of visual product details, for example from different perspective viewpoints, as previously described.

At operation 940, the retrieved images of for-sale items are clustered into groups. Each group is associated with a unique perspective viewpoint of the for-sale item. In some embodiments, a third neural network, that is trained to recognize a similarity of the for-sale items and to recognize a similarity of perspective viewpoint of the images of the for-sale items, is employed to cluster the images of for-sale items into groups.

At operation 950, an image is selected from each group to be provided to the user as a recommended image to enhance the sales offer by providing more visual detail. In some embodiments, the selection is based on a calculation of a value score associated with each retrieved image. The value score is based on factors which can include an indication of whether or not the for-sale item was eventually sold, how many views (or clicks) the for-sale item garnered, or any other suitable metric that can be obtained from the online marketplace.

In some embodiments, additional operations are performed. For example, in some embodiments, as the user accepts the recommendations by uploading further images based on those recommendations, a progress indicator (e.g., a completion status bar) is updated.

Example Computing System

Figure 10:
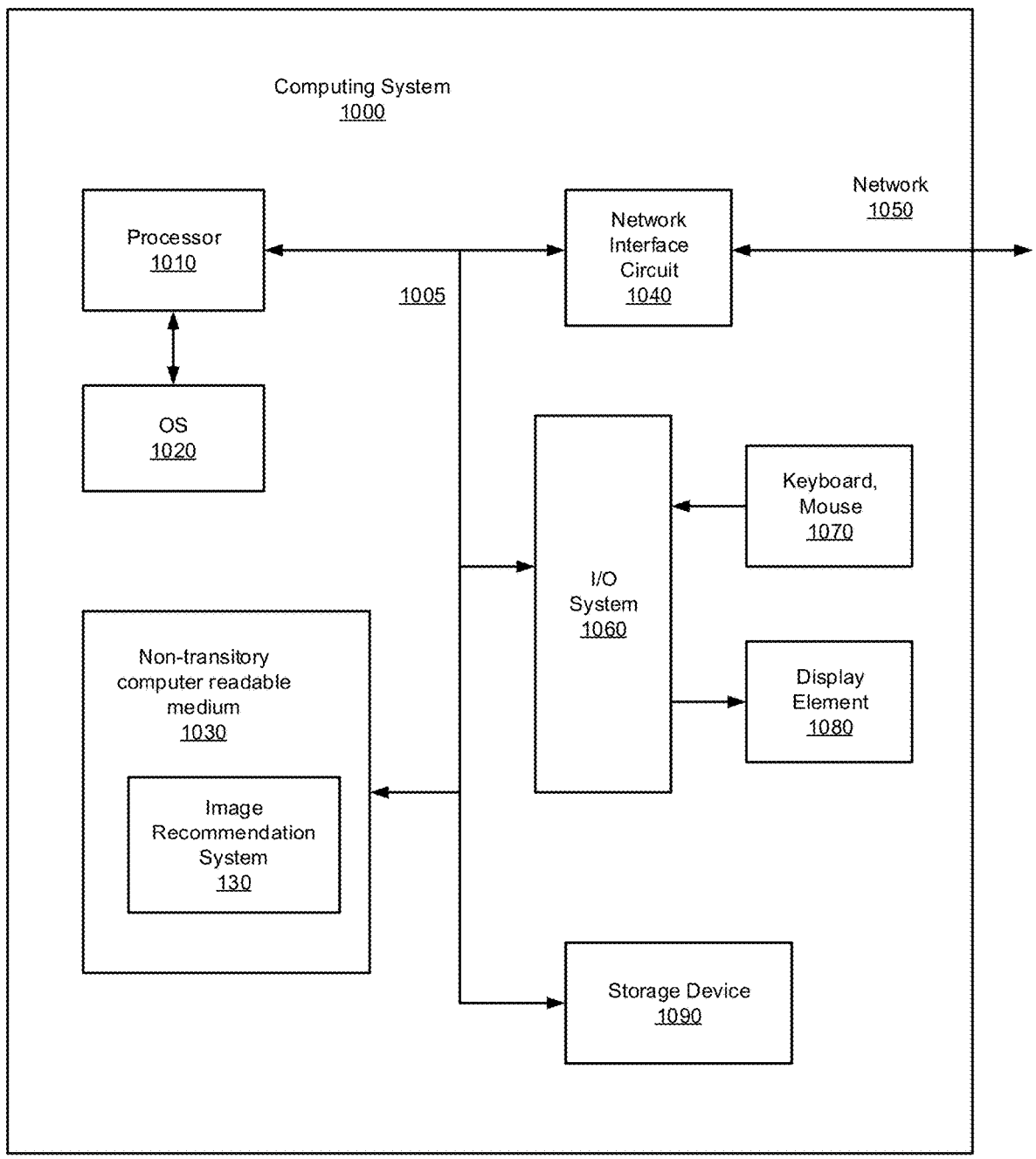
FIG. 10 is a block diagram schematically illustrating a computing platform configured to perform any of the techniques as variously described in this disclosure, configured in accordance with an embodiment of the present disclosure.

FIG. 10 is a block diagram schematically illustrating a computing system 1000 configured to perform any of the techniques as variously described in this disclosure, configured in accordance with an embodiment of the present disclosure. For example, in some embodiments, the image recommendation system 130 of FIG. 1, or any portions thereof as illustrated in FIGS. 2-8, and the methodology of FIG. 9, are implemented in the computing system 1000. In some embodiments, the computing system 1000 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing device that has sufficient processor power and memory capacity to perform the operations described in this disclosure. In some embodiments, a distributed computational system is provided comprising a plurality of such computing devices.

The computing system 1000 includes one or more storage devices 1090 and/or non-transitory computer-readable media 1030 having encoded thereon one or more computer-executable instructions or software for implementing techniques as variously described in this disclosure. In some embodiments, the storage devices 1090 include a computer system memory or random-access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 1090 includes other types of memory as well, or combinations thereof. In one embodiment, the storage device 1090 is provided on the computing system 1000. In another embodiment, the storage device 1090 is provided separately or remotely from the computing system 1000. The non-transitory computer-readable media 1030 include, but are not limited to, one or more types of hardware memory, non-transitory tangible media (for example, one or more magnetic storage disks, one or more optical disks, one or more USB flash drives), and the like. In some embodiments, the non-transitory computer-readable media 1030 included in the computing system 1000 store computer-readable and computer-executable instructions or software for implementing various embodiments. In one embodiment, the computer-readable media 1030 are provided on the computing system 1000. In another embodiment, the computer-readable media 1030 are provided separately or remotely from the computing system 1000.

The computing system 1000 also includes at least one processor 1010 for executing computer-readable and computer-executable instructions or software stored in the storage device 1090 and/or non-transitory computer-readable media 1030 and other programs for controlling system hardware. In some embodiments, virtualization is employed in the computing system 1000 so that infrastructure and resources in the computing system 1000 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 1005 is also provided to allow for communication between the various components listed above and/or other components not shown. Computing system 1000 can be coupled to a network 1050 (e.g., a local or wide area network such as the internet), through network interface circuit 1040 to allow for communications with other computing devices, platforms, resources, clients, and Internet of Things (IoT) devices.

In some embodiments, a user interacts with the computing system 1000 through an input/output system 1060 that interfaces with devices such as a keyboard and mouse 1070 and/or a display element (screen/monitor) 1080. The keyboard and mouse may be configured to provide a user interface to accept user input and guidance, and to otherwise control the image recommendation system 130. The display element may be configured, for example, to display the recommended images using the disclosed techniques. In some embodiments, the computing system 1000 includes other I/O devices (not shown) for receiving input from a user, for example, a pointing device or a touchpad, etc., or any suitable user interface. In some embodiments, the computing system 1000 includes other suitable conventional I/O peripherals. The computing system 1000 can include and/or be operatively coupled to various suitable devices for performing one or more of the aspects as variously described in this disclosure.

In some embodiments, the computing system 1000 runs an operating system (OS) 1020, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing system 1000 and performing the operations described in this disclosure. In one embodiment, the operating system runs on one or more cloud machine instances.

As will be appreciated in light of this disclosure, the various modules and components of the system, as shown in FIGS. 1-8, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the computing system, as described in this disclosure, can be performed by similar processors in different configurations and arrangements, and that the depicted embodiments are not intended to be limiting. Various components of this example embodiment, including the computing system 1000, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Further Example Embodiments

Numerous example embodiments will be apparent, and features described herein can be combined in any number of configurations.

Example 1 is a method for generating image recommendations, the method comprising: identifying, by a first neural network (NN), a product category associated with one or more product images; identifying, by a second NN, a product sub-category associated with the one or more product images; retrieving, by an image retrieval module, one or more images of for-sale items, the retrieving based on a search of for-sale listings using the identified product category and the identified product sub-category; clustering, by a third NN, the retrieved images of for-sale items into a plurality of groups, each group associated with one of N perspective viewpoints of the for-sale item; determining, by a user interface module, a percentage of the N perspective viewpoints that the one or more product images show; causing display, by the user interface module, of an initial progress indicator that depicts the percentage of viewpoints that the one or more product images show; providing, by an image selection module, a selected image from each of the groups as an image recommendation, the selection based on a calculation of a value score associated with each of the images of the for-sale items; and in response to a product image set including the one or more product images being updated to include an additional one or more product images that correspond to one or more of the image recommendations, (1) updating, by the user interface module, the percentage of the N perspective viewpoints that the updated product image set shows, and (2) updating, by the user interface module, the progress indicator based on the updated percentage.

Example 2 includes the subject matter of Example 1, wherein the method includes detecting acceptance of one or more of the image recommendations in response to the additional one or more product images being uploaded through the user interface module.

Example 3 includes the subject matter of Example 1 or 2, wherein the value score is based on an indication of a completed sale of the for-sale item and/or a measure of buyer interest in the image of the for-sale item.

Example 4 includes the subject matter of any of Examples 1 through 3, wherein the first NN is a region-based convolutional neural network trained to detect the product and generate a product category label, the training comprising supervised training using training images collected from a set of product categories of interest.

Example 5 includes the subject matter of any of Examples 1 through 4, wherein the second NN is a convolutional neural network trained to generate a sub-category product label and a confidence score, the training comprising supervised training using training images collected from sets of product sub-categories of interest.

Example 6 includes the subject matter of Example 5, wherein the method includes rotating a given training image through a range of orientation angles to generate additional training images.

Example 7 includes the subject matter of any of Examples 1 through 6, wherein the third NN is a deep ranking convolutional neural network trained to recognize a similarity of the for-sale items and to recognize a similarity of perspective viewpoint of the images of the for-sale items.

Example 8 is a system for generating image recommendations, the system comprising: a first neural network (NN) trained to identify a product category associated with one or more product images; a second NN trained to identify a product sub-category associated with the one or more product images; an image retrieval module configured to retrieve one or more images of for-sale items, the retrieving based on a search of for-sale listings using the identified product category and the identified product sub-category; a third NN trained to cluster the retrieved images of for-sale items into a plurality of groups, each group associated with one of N perspective viewpoints of the for-sale item; a user interface module configured to determine a percentage of the N perspective viewpoints that the one or more product images show and to cause display of an initial progress indicator that depicts the percentage of viewpoints that the one or more product images show; an image selection module configured to provide a selected image from each of the groups as an image recommendation, the selection based on a calculation of a value score associated with each of the images of the for-sale items. The user interface module is further configured to, in response to a product image set including the one or more product images being updated to include an additional one or more product images that correspond to one or more of the image recommendations, (1) update the percentage of the N perspective viewpoints that the updated product image set shows, and (2) update the progress indicator based on the updated percentage.

Example 9 includes the subject matter of Example 8, wherein the user interface module is further configured to detect acceptance of one or more of the image recommendations in response to the additional one or more product images being uploaded through the user interface module.

Example 10 includes the subject matter of Example 8 or 9, wherein the value score is based on an indication of a completed sale of the for-sale item and/or a measure of buyer interest in the image of the for-sale item.

Example 11 includes the subject matter of any of Examples 8 through 10, wherein the first NN is a region-based convolutional neural network trained to detect the product and generate a product category label, the training comprising supervised training using training images collected from a set of product categories of interest.

Example 12 includes the subject matter of any of Examples 8 through 11, wherein the second NN is a convolutional neural network trained to generate a sub-category product label and a confidence score, the training comprising supervised training using training images collected from sets of product sub-categories of interest.

Example 13 includes the subject matter of any of Examples 8 through 12, wherein the third NN is a deep ranking convolutional neural network trained to recognize a similarity of the for-sale items and to recognize a similarity of perspective viewpoint of the images of the for-sale items.

Example 14 is a computer program product including one or more non-transitory machine-readable mediums encoded with instructions that when executed by one or more processors cause a process to be carried out for generating image recommendations for a product, the process comprising: receiving a product image set including one or more product images, each product image depicting the product; retrieving one or more images of for-sale items, the retrieving based on a search of for-sale listings using one or more product categories associated with the product; clustering the retrieved images of for-sale items into a plurality of groups, each group associated with one of N perspective viewpoints of the for-sale item; causing display of an initial progress indicator that indicates a completeness level of the product image set relative to the N perspective views; causing display of a selected image from one of the groups as an image recommendation; and in response to a product image set being updated to include an additional product image that corresponds to the image recommendation, updating the progress indicator.

Example 15 includes the subject matter of Example 14, wherein the process further comprises detecting acceptance of the image recommendation in response to the additional product image being uploaded through a user interface.

Example 16 includes the subject matter of Example 14 or 15, wherein the selected image is selected based on a calculation of a value score for that image, and wherein the value score is based on an indication of a completed sale of the for-sale item and/or a measure of buyer interest in the image of the for-sale item.

Example 17 includes the subject matter of any of Examples 14 through 16, wherein the process further comprises: identifying a product category associated with the one or more product images; and identifying a product sub-category associated with the one or more product images.

Example 18 includes the subject matter of Example 17, wherein: the identifying a product category further comprises employing a region-based convolutional neural network trained to generate a product category label; and the identifying a product sub-category further comprises employing a convolutional neural network trained to generate a sub-category product label and a confidence score.

Example 19 includes the subject matter of Example 18, wherein training of the convolutional neural network includes supervised training using training images collected from sets of product sub-categories of interest. In some such cases, a given training image is rotated through a range of orientation angles to generate additional training images.

Example 20 includes the subject matter of any of Examples 14 through 19, wherein the clustering further comprises employing a deep ranking convolutional neural network trained to recognize a similarity of the for-sale items and to recognize a similarity of perspective viewpoint of the images of the for-sale items.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A computer program product including one or more non-transitory machine-readable mediums encoded with instructions that when executed by one or more processors cause a process to be carried out for generating image recommendations for a product, the process comprising:
receiving a product image set including one or more product images, each product image depicting the product;
retrieving one or more images of for-sale items, the retrieving based on a search of for-sale listings using one or more product categories associated with the product;
clustering the retrieved images of for-sale items into a plurality of groups, each group associated with one of N perspective viewpoints of the for-sale item;

causing display of an initial progress indicator that indicates a completeness level of the product image set relative to the N perspective views;

causing display of a selected image from one of the groups as an image recommendation; and in response to the product image set being updated to include an additional product image that corresponds to the image recommendation, updating the progress indicator.

2. The computer program product of claim 1, wherein the process further comprises detecting acceptance of the image recommendation in response to the additional product image being uploaded through a user interface.

3. The computer program product of claim 1, wherein the selected image is selected based on a calculation of a value score for that image, and wherein the value score is based on an indication of a completed sale of the for-sale item and/or a measure of buyer interest in the image of the for-sale item.

4. The computer program product of claim 1, the process further comprising:

identifying a product category associated with the one or more product images; and identifying a product sub-category associated with the one or more product images.

5. The computer program product of claim 4, wherein:

the identifying a product category further comprises employing a region-based convolutional neural network trained to generate a product category label; and the identifying a product sub-category further comprises employing a convolutional neural network trained to generate a sub-category product label and a confidence score.

6. The computer program product of claim 5, wherein training of the convolutional neural network includes supervised training using training images collected from sets of product sub-categories of interest.

7. The computer program product of claim 1, wherein the clustering further comprises employing a deep ranking convolutional neural network trained to recognize a similarity of the for-sale items and to recognize a similarity of perspective viewpoint of the images of the for-sale items.

8. A method for generating image recommendations, the method comprising:

identifying, by a first neural network (NN), a product category associated with one or more product images;

identifying, by a second NN, a product sub-category associated with the one or more product images;

retrieving, by an image retrieval module, one or more images of for-sale items, the retrieving based on a search of for-sale listings using the identified product category and the identified product sub-category;

clustering, by a third NN, the retrieved images of for-sale items into a plurality of groups, each group associated with one of N perspective viewpoints of the for-sale item;

determining, by a user interface module, a percentage of the N perspective viewpoints that the one or more product images show;

causing display, by the user interface module, of an initial progress indicator that depicts the percentage of viewpoints that the one or more product images show;

providing, by an image selection module, a selected image from each of the groups as an image recommendation, the selection based on a calculation of a value score associated with each of the images of the for-sale items; and in response to a product image set including the one or more product images being updated to include an additional one or more product images that correspond to one or more of the image recommendations, (1) updating, by the user interface module, the percentage of the N perspective viewpoints that the updated product image set shows, and (2) updating, by the user interface module, the progress indicator based on the updated percentage.

9. The method of claim 8, comprising detecting acceptance of one or more of the image recommendations in response to the additional one or more product images being uploaded through the user interface module.

10. The method of claim 8, wherein the value score is based on an indication of a completed sale of the for-sale item and/or a measure of buyer interest in the image of the for-sale item.

11. The method of claim 8, wherein the first NN is a region-based convolutional neural network trained to detect the product and generate a product category label, the training comprising supervised training using training images collected from a set of product categories of interest.

12. The method of claim 8, wherein the second NN is a convolutional neural network trained to generate a sub-category product label and a confidence score, the training comprising supervised training using training images collected from sets of product sub-categories of interest.

13. The method of claim 1, further comprising rotating a given training image through a range of orientation angles to generate additional training images.

14. The method of claim 8, wherein the third NN is a deep ranking convolutional neural network trained to recognize a similarity of the for-sale items and to recognize a similarity of perspective viewpoint of the images of the for-sale items.

15. A system for generating image recommendations, the system comprising:

a first neural network (NN) trained to identify a product category associated with one or more product images;

a second NN trained to identify a product sub-category associated with the one or more product images;

an image retrieval module configured to retrieve one or more images of for-sale items, the retrieving based on a search of for-sale listings using the identified product category and the identified product sub-category;

a third NN trained to cluster the retrieved images of for-sale items into a plurality of groups, each group associated with one of N perspective viewpoints of the for-sale item;

a user interface module configured to determine a percentage of the N perspective viewpoints that the one or more product images show and to cause display of an initial progress indicator that depicts the percentage of viewpoints that the one or more product images show;

an image selection module configured to provide a selected image from each of the groups as an image recommendation, the selection based on a calculation of a value score associated with each of the images of the for-sale items; and the user interface module further configured to, in response to a product image set including the one or more product images being updated to include an additional one or more product images that correspond to one or more of the image recommendations, (1) update the percentage of the N perspective viewpoints that the updated product image set shows, and (2) update the progress indicator based on the updated percentage.

16. The system of claim 15, the user interface module further configured to detect acceptance of one or more of the image recommendations in response to the additional one or more product images being uploaded through the user interface module.

17. The system of claim 15, wherein the value score is based on an indication of a completed sale of the for-sale item and/or a measure of buyer interest in the image of the for-sale item.

18. The system of claim 15, wherein the first NN is a region-based convolutional neural network trained to detect the product and generate a product category label, the training comprising supervised training using training images collected from a set of product categories of interest.

19. The system of claim 15, wherein the second NN is a convolutional neural network trained to generate a sub-category product label and a confidence score, the training comprising supervised training using training images collected from sets of product sub-categories of interest.

20. The system of claim 15, wherein the third NN is a deep ranking convolutional neural network trained to recognize a similarity of the for-sale items and to recognize a similarity of perspective viewpoint of the images of the for-sale items.

\* \* \* \* \*